United States Patent
Engardio et al.

(10) Patent No.: US 6,863,848 B2
(45) Date of Patent: Mar. 8, 2005

(54) METHODS FOR PREPARING COMPOSITE PHOTOCHROMIC OPHTHALMIC LENSES

(75) Inventors: Thomas J. Engardio, Vista, CA (US); Paul D. Schlunt, Oceanside, CA (US); Jimmie E Adcock, Oceanside, CA (US)

(73) Assignee: Signet Armorlite, Inc., San Marcos, CA (US)

( * ) Notice: Subject to any disclaimer, the term of this patent is extended or adjusted under 35 U.S.C. 154(b) by 0 days.

(21) Appl. No.: 10/232,447

(22) Filed: Aug. 30, 2002

(65) Prior Publication Data

US 2004/0041287 A1 Mar. 4, 2004

(51) Int. Cl.⁷ ............................................. B29D 11/00
(52) U.S. Cl. ..................... 264/1.36; 264/1.7; 425/808; 425/812
(58) Field of Search ..................... 264/1.1, 1.7, 1.36, 264/1.38; 425/808, 812

(56) References Cited

U.S. PATENT DOCUMENTS

| | | | |
|---|---|---|---|
| 3,565,814 A | 2/1971 | Pellon | 252/300 |
| 4,544,572 A | 10/1985 | Sandvig et al. | 427/44 |
| 4,756,973 A | 7/1988 | Sakagami et al. | 428/412 |
| 4,758,448 A | 7/1988 | Sandvig et al. | 351/166 |
| 4,851,471 A | 7/1989 | Maltman et al. | 524/719 |
| 5,021,196 A | 6/1991 | Crano et al. | 252/586 |
| 5,130,353 A | 7/1992 | Fischer et al. | 524/43 |
| 5,185,390 A | 2/1993 | Fischer et al. | 524/43 |
| 5,316,702 A | 5/1994 | Blum et al. | 264/1.7 |
| 5,319,007 A | 6/1994 | Bright | 523/516 |
| 5,405,557 A | 4/1995 | Kingsbury | 264/1.7 |
| 5,523,030 A | 6/1996 | Kingsbury | 264/1.7 |
| 5,531,940 A | 7/1996 | Gupta et al. | 264/1.7 |
| 5,683,628 A | 11/1997 | Mizune et al. | 252/586 |
| 5,694,195 A | 12/1997 | Engario et al. | 351/177 |
| 5,852,112 A | 12/1998 | Engardio et al. | 525/23 |
| 5,882,556 A | 3/1999 | Perrott et al. | 264/1.38 |
| 5,886,764 A | 3/1999 | Engardio et al. | 351/177 |
| 5,910,516 A | 6/1999 | Imura et al. | 522/39 |
| 5,914,174 A | 6/1999 | Gupta et al. | 428/174 |
| 5,959,761 A | 9/1999 | Perrott et al. | 359/244 |
| 6,068,797 A * | 5/2000 | Hunt | 264/1.7 |
| 6,099,123 A | 8/2000 | Engardio et al. | 351/177 |
| 6,171,525 B1 | 1/2001 | Effer et al. | 252/586 |
| 6,221,284 B1 | 4/2001 | Florent et al. | 252/586 |
| 6,329,482 B1 | 12/2001 | Henry | 526/260 |

OTHER PUBLICATIONS

PCT Search Report dated Dec. 18, 2002.

* cited by examiner

Primary Examiner—Mathieu D. Vargot
(74) Attorney, Agent, or Firm—Ice Miller (57) ABSTRACT

A method of manufacturing a composite photochromic ophthalmic lens having an index of refraction of at least 1.49 is disclosed. The method comprises providing against a front portion of a mold, a first ophthalmic lens-forming composition including a polymerizable monomer, oligomer, or polymer and a photochromic compound; filling a rear portion of the mold with a second ophthalmic lens-forming composition, sufficiently different from the first ophthalmic lens-forming composition such that a distinct phase boundary results between the two compositions after complete curing of the two compositions, the second ophthalmic lens-forming composition including a polymerizable monomer, oligomer or polymer that is different from the monomer, oligomer or polymer of the first ophthalmic lens-forming composition, such that the second ophthalmic lens-forming composition is in contact with the first lens-forming composition, wherein either the first or second ophthalmic lens-forming composition is gelled before adding the other ophthalmic lens-forming composition, in an ungelled state, to the mold; and curing the first and second ophthalmic lens-forming compositions simultaneously, while the first and second ophthalmic lens-forming compositions are in intimate contact.

34 Claims, 3 Drawing Sheets

METHODS FOR PREPARING COMPOSITE PHOTOCHROMIC OPHTHALMIC LENSES

CROSS REFERENCE TO RELATED APPLICATIONS

The present application is related to the patent application entitled "Photochromic Matrix Compositions For Use In Ophthalmic Lenses", filed concurrently with this application, the entire contents of which is incorporated herein by reference.

FIELD OF THE INVENTION

The present invention is directed to composite photochromic ophthalmic lenses in either finished cast form or semifinished form, and a method of making the lenses. The lenses include two different lens layers deposited separately in a mold for curing the two layers together, comprising: (a) a first layer of polymer approximately one to two millimeters in thickness containing one or more photochromic dyes with a finished front surface curvature suitable for use as an ophthalmic lens element, and (b) a second non-photochromic layer of a different polymer and associated rear surface curvature. One of the layers (a) or (b) is partially cured to the gel state before filling the remainder of the mold with the other layer, in a liquid, non-gelled state. Both layers are then cured while in contact with each other to prevent delamination of the two layers and allow for the formation of a lens with optimized layer properties.

BACKGROUND OF THE INVENTION

There are various processes in use today to produce photochromic ophthalmic lenses—lenses that have the ability to darken when exposed to certain wavelengths of light (such as are contained in sunlight). Among the most common processes are those which imbibe photochromic dyes into the surface of a receptive lens substrate, wherein the prior art describes the dye permeating to a depth of approximately 50 microns (e.g., U.S. Pat. Nos. 5,021,196; 5,130,353; 5,185,390; and 5,882,556). Another type of process directly incorporates the photochromic dyes into a polymerizable casting composition which is then suitably cured to form an ophthalmic lens. Usable photochromic compounds and compositions are covered by numerous patents. Still another process surface casts and cures a polymerizable composition containing photochromic dyes between a front surface mold and a hard lens to form a composite lens (U.S. Pat. No. 5,531,940). Yet another process involves coating a hard lens with a polymerizable coating containing photochromic compounds (e.g., as disclosed in the specification of U.S. Pat. No. 4,756,973).

Other patents, such as this Assignee's U.S. Pat. Nos. 4,758,448 and 4,544,572, disclose the formulation of an abrasion resistant outer coating by gelling a thin (less than about 50 microns) coating material on the surface of a mold and subsequently casting a lens-forming composition onto it, and curing the lens-forming material, wherein the abrasion-resistant outer coating material is not suitable (too hard) for incorporating photochromic compounds.

Each of these processes present certain unique problems. The photochromic performance of lenses which have relatively thin photochromic layers, such as those made by coating (a few microns thick) or by imbibing (perhaps a hundred microns thick) generally degrade faster then those made with the photochromic dyes incorporated throughout the lens.

Lenses made with the photochromic dye incorporated throughout the lens tend to be darker in the unactivated (faded) state due to the inherent color of the dye and the thickness of the lens body. Additionally, color density variations due to thickness variations in an ophthalmic lens prepared to prescription (especially strong prescriptions) can be objectionable in both the activated (darkened) state and the faded state. These lenses can be quite expensive to produce because of the high cost of the photochromic dyes, and when used to make a semifinished lens blank, a considerable amount of dye is wasted in producing a finished prescription lens during the grinding process.

Precautions must be taken when producing composite lenses by surface casting, as disclosed in Gupta et al. U.S. Pat. No. 5,531,940, to ensure good adhesion between the polymerized photochromic layer and the hard lens it is attached to. Such precautions include certain surface modifications to the lens preform as disclosed in Blum et al., U.S. Pat. No. 5,316,702. If conditions are not correct, delamination of the layers can occur.

Composite lenses made by such surface casting of a polymerizable composition onto a hard lens, such as a preform or semifinished lens, suffer from relatively weak bonding between the cast layer and the hard lens. Further, as stated in U.S. Pat. No. 5,405,557, composite lenses manufactured by partially curing one layer of a polymerizable lens-forming composition, and then filling the mold with a second polymerizable lens-forming composition prior to curing the two layers together avoids weakness between the two layers only when the two layers are sufficiently compatible that the fully cured, two layer lens is homogeneous and does not contain a distinct phase boundary between the layers. In accordance with the present invention, using two layers of different polymerizable monomers, oligomers, or polymers, which result in a distinct phase boundary between adjacent, fully cured layers, results in little to no weakness between the layers such that delamination does not occur.

The front and rear layers of the composite lenses manufactured in accordance with the present invention are different in chemical composition and will also be different with respect to other physical properties such as index of refraction, ABBE number, hardness, density, and the like, such that the finished lenses contain a distinct phase boundary between the layers. The covalent chemical bonding between the layers at the boundary minimizes problems associated with optical interference, reflection and adhesion which would otherwise be expected.

In the preferred embodiment, the photochromic front layer may be composed of a material which is of a chemical composition beneficial for photochromic dye performance, but may not be optimal for other desired lens properties such as grinding and polishing (e.g., the layer may be relatively soft, but allow for rapid switching of the dye from light to dark and dark to light). The rear layer may be composed of a different material beneficial for properties needed for the body of the lens, for example, a composition which is harder and thus more suitable for grinding and polishing operations, impact strength, tinting, and the like. By manufacturing the composite lenses such that the photochromic dye does not permeate the under layer, the photochromic layer can be concentrated in the outer layer that is beneficial for photochromic dye performance without loss of dye in a layer that is not beneficial for photochromic dye performance.

Gupta et al. U.S. Pat. No. 5,531,940 discloses the initial formation of a coated layer of a photochromic dye-containing casting resin that is in the gel state in a thickness of about 0.025 mm to 1 mm that is subsequently cured while in contact with a finished or semifinished plastic lens preform, with or without a layer of an uncured resin there between. Gupta et al. '940 requires a finished or semifinished plastic lens preform and, optionally, an outer layer of lens material having a higher cross-link density than the lens material carrying the photochromic dye in order to obtain sufficient scratch resistance on the outer surface of the lens, due to the softness of the photochromic dye-containing outer layer. A thin layer of resin is necessary in the Gupta et al. process, which requires a finished or semifinished preform, "to promote rapid curing and decrease the probability of developing stress and distortion in the resulting finished lens".

It would be highly desirable to manufacture a composite or layered photochromic lens that has an outer photochromic dye-containing polymeric lens layer that has a thickness greater than about 1 mm in order to extend the useful life of the photochromic layer beyond that obtained in the prior art. It also would be highly desirable to manufacture a composite photochromic lens having a relatively thick photochromic dye-containing layer that can be cured relatively quickly without suffering from layer adhesion, stress and distortion problems commonly associated with the manufacture of composite lenses. It would also be desirable to manufacture a lens having the above-described photochromic layer and at the same time provide a distinct boundary between the photochromic and adjacent lens material layer to permit ready verification of the uniformity and thickness of the photochromic layer. These problems have been overcome in accordance with the principles of the present invention, as will become more apparent from the following detailed description of the present invention, wherein (a) a photochromic dye-containing resin, having a thickness of at least 0.4 mm, preferably at least about 0.5 mm, more preferably thicker than about 1 mm, is cured while in contact with (b) a layer of a resin capable of forming an ophthalmic lens, free of a photochromic dye, wherein one of the layers (a) or (b) is cured to the gel state prior to adding the other layer, in a liquid ungelled state, to the mold (without including a finished or semifinished lens preform in the mold), and curing the composite layers, together, using either thermal and/or actinic radiation, e.g., UV, methods, most preferably with actinic radiation.

In accordance with one embodiment of the process of the present invention, a relatively thick layer (at least about 0.4 mm in thickness, preferably about 1 to 2 mm) of a free radical polymerizable monomer or oligomer composition containing one or more photochromic dyes is placed on the surface of a mold used to produce the front surface of the lens. The composition is partially cured to form a soft gel with a degree of hardness, as measured with a Barber Colman type 935 machine of less than 65, preferably less than 60, more preferably less than 40, still more preferably less than 20, most preferably less than 5. The front surface mold containing the photochromic gel is then used in combination with a suitable gasket and a glass mold with appropriate curvature to form a closed assembly into which is cast a polymerizable liquid composition containing no photochromic dye. The photochromic front surface gel layer and the non-photochromic polymerizable composition are then cured while in close contact to form a hard plastic which is then separated from the gasket and molds, resulting in the composite photochromic lens, having exceptional adherence of the layers, which will not delaminate.

In accordance with another embodiment of the process of the present invention, a relatively thick layer of at least about 0.4 mm in thickness, preferably about 1 to 20 mm, of a free radical polymerizable monomer or oligomer composition that does not contain a photochromic dye is placed between the surfaces of two molds of suitable curvature to produce the rear layer of the composite lens. The composition is partially cured to form a soft gel (preferably with a degree of hardness as previously defined). The rear surface mold containing the gel is then used in combination with a suitable gasket and a glass mold with appropriate curvature to form a closed assembly into which is placed a polymerizable liquid composition containing a photochromic dye to form the front, photochromic lens layer. The polymerizable photochromic front surface composition and the non-photochromic gel layers are then cured while in close contact to form a hard plastic lens comprised of both layers with a distinct boundary between them. The formed lens is then separated from the gasket and molds, resulting in the composite photochromic lens, having exceptional adherence of the layers, which will not delaminate.

Figure 1:
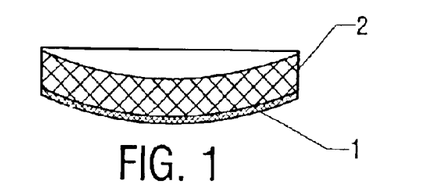
FIG. 1 is a side view of a lens made in accordance with the principles of the present invention. The photochromic layer 1 is bonded to the non-photochromic layer 2, with a discrete boundary layer existing between layers 1 and 2.

The resulting lens shown in FIG. 1 overcomes a number of problems previously described. First, the photochromic layer 1 can be relatively thick, allowing for potentially better photochromic lifetime than coated or imbibed lenses. Second, the photochromic layer has a generally uniform thickness which is relatively thin when compared to the thickness of the lens as a whole. As such, the overall darkness and color uniformity is superior to lenses incorporating the photochromic dyes throughout the lens material. Third, because either the photochromic dye-containing layer 1 or the layer containing no photochromic dye 2 is partially polymerized to a gel state when the ophthalmic lens composition forming the other (uncured) layer is introduced into the assembly, and the two layers are then together brought to the cured state, each layer is cured while in contact with the other, and covalent chemical bonding occurs between the two layers resulting in excellent adhesion.

SUMMARY OF THE INVENTION

In brief, the lenses of the present invention are formed by either of the following methods (1) depositing, in a suitable cavity formed by two molds separated by a gasket, a first layer of a radical polymerizable ophthalmic lens forming monomer, oligomer, or polymer, containing one or more photochromic materials, to form a front portion of the lens, and gelling the first layer in the mold prior to adding a second layer of a suitable radical polymerizable ophthalmic lens composition, or (2) depositing, in a suitable front mold and attached gasket, a quantity of a radical polymerizable ophthalmic lens forming monomer, oligomer, or polymer, containing one or more photochromic materials, to form a front portion of the lens, and attaching a gel of appropriate geometry formed by partially polymerizing an ophthalmic lens forming composition, such that the photochromic composition layer is contained in the cavity between the front mold and the gel layer. The assemblies produced by either of these two methods are then subjected to suitable curing conditions such that both layers are cured together while in contact with each other, so that covalent chemical bonds are formed between the two compositions, hence eliminating the possibility of delamination.

Accordingly, one aspect of the present invention is to provide a method of making a composite ophthalmic lens from two layers of different ophthalmic lens-forming materials, made by gelling one of two layers of an ophthalmic lens-forming composition—either (1) a front layer that includes a photochromic compound, on a front portion of a mold, or (2) a rear ophthalmic lens-forming composition that does not include a photochromic compound, on a rear portion of a mold, such that one gelled layer (front or rear lens portion) and one ungelled layer (front or rear lens portion) are in intimate contact with each other within the assembly, and then curing the two layers together to form the composite lens.

One advantage of using two layers of different lens forming materials lies in the opportunity to optimize each layer for unique lens properties. That is, a photochromic front layer may be composed of a material which is of a chemical composition beneficial for photochromic dye performance, but not optimal for other desired lens properties such as grinding and polishing (e.g., the layer may be relatively soft, but allow for rapid switching of the dye from light to dark and dark to light). The rear layer may be composed of a different material beneficial for properties needed for the body of the lens, for example, a composition which is harder and thus more suitable for grinding and polishing operations, impact strength, tinting, and the like.

Since the materials used to form the front and rear layers of the lens are different with respect to chemical composition and will also be different with respect to other physical properties such as index of refraction, ABBE number, hardness, density, and the like, a distinct boundary between the layers will exist. Such a distinct boundary layer provides a ready visual verification useful for adjustments to the manufacturing process, such as adjustment of mold gasket placement. The covalent chemical bonding between the layers at the boundary minimizes problems associated with optical interference, reflection and adhesion which might otherwise be expected.

The covalent chemical bonding is achieved by making a composite lens by having two layers that are polymerized and cured simultaneously—a front layer of an ophthalmic lens-forming composition containing one or more photochromic dyes and a rear layer of an ophthalmic lens-forming composition that does not contain a photochromic dye, the front and rear layers being formed by different polymers. Either the front layer or the rear layer, but not both, is polymerized to a gel stage defined as having a hardness, as measured using a Barber Colman type 935 machine of less than 65, preferably less than 60, more preferably less than 40, still more preferably less than 20, most preferably less than 5, within the mold prior to injecting the other layer into the mold in a liquid, ungelled state. In one embodiment, the rear layer is not cured when injected, but is an ophthalmic lens-forming monomer or an ophthalmic lens-forming oligomer that is injected into the mold at a degree of cure less than the gel stage. In another embodiment, the rear layer is first gelled, and then the front, uncured layer containing a photochromic dye and an ophthalmic lens-forming monomer, or an ophthalmic lens-forming oligomer, is placed into the mold at a degree of cure less than the gel stage. Gelling either layer prior to injecting the other layer of ophthalmic lens-forming composition into the mold, and injecting the other layer of ophthalmic lens-forming composition at a degree of cure less than the gel stage, will ensure complete filling of the mold and intimate contact between the two layers, without significant leaching of the photochromic dye(s) from the front layer into the rear layer. Subsequent curing of both layers together, such as by using a photoinitiator and irradiation in a suitable wavelength range to provide a dual layer lens, provides a composite lens that does not delaminate.

Other aspects and advantages of the present invention are to provide a method of making a two layer photochromic lens that includes one or more photochromic dyes in only a front layer at a thickness greater than about 0.4 mm, without coating or impregnating a cured lens, that has a significantly longer life without photochromic dye degradation; the color contribution of the photochromic dye(s) in the faded state being less than a lens that includes the photochromic dye(s) throughout the thickness of the lens; the lens wasting significantly less photochromic dye(s) when finishing the lens blank into a finished lens in the grinding process; and providing a two layer lens that does not suffer from the frequent delamination that can occur when curing an uncured layer to a lens preform that is pre-cured beyond the gel stage (such as a finished or semi-finished preform).

Composite photochromic lenses can be produced using the disclosed methods in either finished cast form or semi-finished form. As finished cast lenses, the lens configuration is such that, except for a subsequent edging step to grind the perimeter of the lens to conform to the shape of the eyeglass frame, the lens is of proper power and thickness for wear by an individual with the appropriate power prescription. The lens would also possess curve features necessary to correct for astigmatism, if required. In composite finished lenses, typically, the front photochromic layer would be from about 0.4 mm to about 2 mm in thickness, preferably about 0.5 mm to about 2 mm, while the rear non-photochromic layer would be from about 0.2 mm to about 5 mm, preferably about 0.5 mm to about 5 mm, in thickness as configured to accommodate typical frame sizes and a majority of prescriptions.

While advantages can be obtained by using the described composite technology to produce finished lenses with regard to reduction in waste of relatively expensive photochromic dyes lost during the edging process when compared to lenses containing photochromic dyes throughout the lens body, a much more significant savings can be realized in the case of semifinished lenses. The configuration of semifinished lenses is such that rear surface grinding and polishing steps are required to bring the rear surface geometry to a condition required to produce a given lens power and thickness given the front curvature and index of refraction of the semifinished lens. Significant amounts of the semifinished lens material are lost during this operation adding to the loss by the edging operation, in many cases totaling 50 percent or more. By confining the photochromic dyes to the front surface layer only, a large amount of dye waste can be avoided. In the semifinished case, typically, the front photochromic layer would be from about 0.4 mm to about 2 mm in thickness, preferably about 0.5 mm to about 2 mm, more preferably more than about 1 mm to about 2 mm, while the rear non-photochromic layer would be from about 5 mm to about 20 mm in thickness.

The above and other aspects and advantages of the present invention will become more apparent from the following detailed description of the preferred embodiments, taken in conjunction with the drawings.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

DETAILED DESCRIPTION OF THE INVENTION

Any photochromic dye-containing ophthalmic lens-forming composition that includes a radical polymerizable monomer or oligomer can be used for the front portion of the lens. To achieve the full advantage of the present invention, the lens-forming composition used for the front portion of the lens preferably has a SEB abrasion resistance, after curing, below 20 psi, preferably below about 15 psi, according to the method disclosed in U.S. Pat. Nos. 4,544,572 and 4,758,448. The layers may be brought to the gel state, and subsequently cured using any suitable method including thermal and radiation curing techniques. Preferably, both the front and rear layers include a photopolymerization initiator so that both layers can be cured simultaneously with light having a suitable wavelength. Conventional ultraviolet or visible light photoinitiators can be used in the front or rear layer compositions. Examples of the front layer (photochromic dye-containing) and rear layer (containing no photochromic dyes) ophthalmic lens monomers and/or oligomers include mono, di, tri, tetra and pentafunctional acrylates, such as alkoxylated acrylates derived from di or trimethylol alkanes or pentaerethrytol marketed by Sartomer, Polysciences and others; methacrylates; vinyl monomers such as styrene; allyl monomers such as HIRI, CR-39 and CR-307 marketed by PPG Industries; epoxies; urethanes and/or esters terminated with acrylic groups; and unsaturated polyester resins and mixtures of polyester resins and these compounds.

Examples of radical-polymerizable monomers usable in one or both layers of the lenses of the present invention are as disclosed in U.S. Pat. No. 5,910,516, hereby incorporated by reference.

The acrylate and methacrylate compounds include, for example, tridecyl methacrylate, diethylene glycol diacrylate and dimethacrylate, triethylene glycol diacrylate and dimethacrylate, tetraethylene glycol diacrylate and dimethacrylate, and higher molecular weight polyethylene glycol diacrylates and dimethacrylates, butanediol dimethacrylate, hexamethylene dimethacrylate, bisphenol A dimethacrylate, 1,12-dodecanediol dimethacrylate, 2,2-bis (4-methacryloyloxyethoxy-3,5-dibromophenyl) propane, 2,2-bis(4-methacryloyloxyphenyl)propane, 2,2-bis(4-methacryloyloxydiethoxyphenyl)propane, 2,2-bis(4-methacryloyloxytriethoxyphenyl)propane, 2-2-bis(4-methacryloyloxypentaethoxyphenyl)propane, trimethylolpropane triacrylate, alkoxylated acrylates and methacrylates, alkoxylated diacrylates and dimethacrylates, alkoxylated triacrylates and trimethacrylates, isobornyl acrylate and methacrylate, cyclohexyl acrylate and methacrylate, and trimethyl cyclohexyl acrylate and methacrylate.

Epoxy group-containing acrylate or methacrylate compounds include, for example, glycidyl acrylate, glycidyl methacrylate, β-methylglycidyl acrylate, β-methylglycidyl methacrylate and bisphenol A monoglycidyl ether methacrylate.

Urethane acrylates and methacrylates include mono, di, tri, and tetra functional urethane acrylates and methacrylates sold by Sartomer, Degussa, and others.

The vinyl compounds include, for example, bis-4-vinylbenzyl ether, bis-4-vinylbenzyl sulfide, 1,2-(p-vinylbenzyloxy)ethane, 1,2-(p-vinyl-benzylthio)ethane and bis-(p-vinylbenzyloxyethyl) sulfide.

In addition, the composition can include an unsaturated carboxylic acid, an acrylic or methacrylic acid ester, a fumaric acid ester and an aromatic vinyl compound. The unsaturated carboxylic acid includes, for example, acrylic acid, methacrylic acid, maleic anhydride, fumaric acid and acrylic acid. The acrylic and methacrylic acid esters includes, for example, methyl acrylate, methyl methacrylate, benzyl methacrylate, phenyl methacrylate, tribromophenyl methacrylate, 2-hydroxyethyl methacrylate, and trifluoromethyl methacrylate. The fumaric acid ester includes, for example, monomethyl fumarate, diethyl fumarate and diphenyl fumarate. The aromatic vinyl compound includes, for example, styrene, chlorostyrene, alpha-methylstyrene, 4-methylstyrene, vinylnaphthalene, isopropenyl naphthalene, bromostyrene and divinylbenzene. These radical-polymerizable monomers may be used singly or in admixture of two or more.

Suitable unsaturated polyester resins includes those made from unsaturated dicarboxylic acids such as maleic and fumaric acids, saturated dicarboxylic acids, such as orthophthalic acid and isophthalic acid, and polyhydric alcohols such as ethylene glycol, diethylene glycol, neopentyl glycol, and hydrogenated bisphenol-A.

The preferred front portion of the lens is a composition comprising mono, di, or tri functional acrylic or methacrylic monomers; mono, di, or tri functional urethane acrylates or methacrylates, allylic monomers, unsaturated polyester resins, vinyl monomers, and mixtures thereof. Preferably, the front portion of the ophthalmic lens, and the rear (eye-facing) portion, have a refractive index of at least 1.49. The index of refraction of either portion can be at least about 1.49, at least about 1.53, at least about 1.56, or at least about 1.58.

Preferred acrylates and methacrylates include mono, di, and tri functional acrylates and methacrylates including tridecyl methacrylate; 1,12-dodecanediol dimethacrylate; and trimethylolpropane trimethacrylate.

The preferred urethane methacrylate is a diurethane dimethacrylate.

The preferred allylic monomers include diallyl phthalate, diethylene glycol bisallyl carbonate, diallyl diphenate, bisphenol A bisallyl carbonate, and 2,2'-diallylbisphenol-A.

The photochromic compound contained in the photopolymerizable composition used as the front lens layer of the present invention may be any known photochromic compound as long as it has an absorption in a visible light region when the compound is activated (i.e., darkened). Photochromic compounds showing an absorption property in a range of around 400 to 480 nm develop a yellow to orange color; photochromic compounds showing absorption property in a range of around 480 to 550 nm develop a red to purple color; and photochromic compounds showing absorption property in a range of around 550 to 600 nm develop a purple to blue color. These photochromic compounds may be used singly but, when used in combination of two or more, can develop a neutral color such as gray, brown, amber or the like.

Preferred photochromic additives are, for example, spiropyrans, spirooxazines, naphthopyrans, benzopyrans or chromene compounds, spironaphthoxazines, spirobenzoxazines, organo-metal dithizonates, and fulgide or fulgimide compounds and mixtures thereof. Examples of these families follow.

As the chromene compounds, any known compounds having a chromene skeleton and a photochromic property can be used. Specific examples thereof include 2,2-Diphenyl-7-octoxy(2H)benzo(f)chromene, Spiro(bicyclo [3.3.1]nonane-9,2'-(2H)benzo(h) chromene), Spiro (norbornane-2,2'-(2H)benzo(h)chromene), 7'-Methoxyspiro (bicyclo[3.3.1]nonane-9,2'-(2H)benzo-(h)chromene), 7'-Methoxyspiro(norbornane-2,2'-(2H)benzo(h)chromene), and 2,2-Dimethyl-7-octoxy(2H)benzo(f)chromene.

The fulgide compounds may be any known compounds having a fulgide skeleton and a photochromic property.

Specific examples thereof include N-Methyl-6,7-dihydro-4-methylspiro(5,6-benzo[b]thiophene-dicarboxyimido-7,2-tricyclo[3.3.1.1]decane, N-Cyanomethyl-6,7-dihydro-4-methyl-2-phenylspiro(5,6-benzo[b]thiophenedicarboxyimido-7,2-tricyclo-[3.3.1.1]decane, N-Cyanomethyl-6,7-dihydro-4-methyl-2(p-methoxyphenyl)-spiro(5,6-benzo[b]thiophenedicarboxyimido-7,2-tricyclo-[3.3.1.1]decane, N-Cyanomethyl-6,7-dihydro-4-methylspiro(5,6-benzo[b]thio-phenedicarboxyimido-7,2-tricyclo[3.3.1.1]decane, N-Cyanomethyl-6,7-dihydro-4-cyclopropylspiro(5,6-benzo [b]-thiophenedicarboxyimido-7,2-tricyclo[3.3.1.1]decane, and 6,7-Dihydro-N-methoxycarbonylmethyl-4-methyl-2-phenylspiro(5,6-benzo[b]thiophenedicarboxyimido-7,2-tricyclo[3.3.1.1]decane.

As the spriooxazine compounds, any known compounds having a spirooxazine skeleton and a photochromic property can be used. Specific examples thereof include 1,3,3-Trimethyl-spiro(indole-2,3-[3,2-a][1,4]naphthooxazine, 1,3,3-Trimethyl-6'-piperidinospiro(indole-2,3-[3,2-a][1,4]-naphthooxazine, 6-Fluoro-1'-methyl-8'-methoxy-6'-morpholinodispiro(cyclo-hexane-1,3'-(3H)indole-2'-(2'H), 3'-(3H)naphtho(3,2-a)(1,4)-oxazine), 1'-Methoxycarbonylmethyl-8'-methoxy-6'-(4-methylpiperazino)dispiro(cyclohexane-1,3'-(3H)indole-2'-(2'H),3'(3H)-naphtho(3,2-a)(1,4)oxazine), 1'-(2,Dioxazine-2-yl)ethyl)-6'-morpholinodispiro(cyclo-hexane-1,3'(3H) indole-2'-(2'H),3'-(3H)naphtho(3,2-a)(1,4)oxazine), 5-Fluoro-1'-methyl-6'-piperidinodispiro(cyclohexane-1,3'-(3H)indole-2'-(2'H),3'-(3H)naphtho(3,2-a)(1,4)oxazine), and 8'-Methoxydispiro(cyclohexane-1,3'-(3 H)indole-2'-(2'H),3'-(3H)naphtho(2,3-a)(1,4)oxazine).

Preferred photoinitiators for both layers are the phosphinates, such as ethyl 2,4,6-trimethylbenzoylphenyl phosphinate; and phosphine oxides, such as 2,4,6-trimethylbenzoyl-diphenylphosphine oxide; bis(2,6-dimethoxybenzoyl)-2,4-,4-trimethylpentyl phosphine oxide, bis(2,4,6-trimethylbenzoyl) phenyl phosphine oxide and commercial mixtures containing these compounds such as Irgacure 1850, Irgacure 1700, Darocur 4265, and the like. Preferred thermal initiators include azo compound initiators such as 2,2'-azobis(2-methylbutyronitrile) and 2,2'-azobis (isobutyronitrile).

The amount of the photochromic compound used in the front layer composition will depend on the desired contribution to developed color density. A usable range would be about 0.001 to 1.0 percent by weight, more preferably about 0.005 to about 0.5 percent by weight, based on the weight of the polymerizable compound(s) contained in the front layer.

The front and rear photopolymerizable compositions of the present invention can contain, as necessary, various stabilizers and additives such as mold-releasing agents, ultraviolet absorbers, hindered amines or other ultraviolet light stabilizers, antioxidants, coloring inhibitors, antistatic agents, fluorescent dyes, dyes, pigments, or the like.

First Embodiment—Front Lens-Forming Composition Gelled

Figure 2:
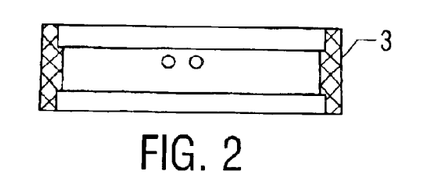
FIG. 2 is a side view showing a typical gasket 3 used to separate two mold surfaces during a lens casting operation.
Figure 3:
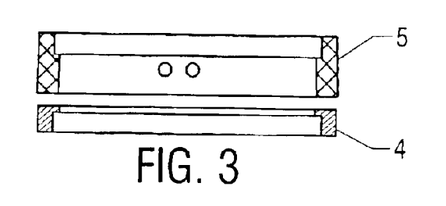
FIG. 3 is a side view showing a way to make a suitable assembly to make the lenses of the present invention by cutting a typical ophthalmic lens manufacturing gasket 3 into front 4 and rear 5 portions ("half gaskets"), and providing the resulting two gaskets for molding the two lens layers together to form the composite ophthalmic lenses of the present invention.

To produce the composite photochromic semifinished lenses of one aspect of the present invention, a two-part gasket is used. A gasket used to normally produce a 75 mm diameter semifinished lens, as shown in FIG. 2 with an edge thickness of 10 mm was circumferentially cut as shown in FIG. 3 using a lathe in such a way as to produce a "front half-gasket" 4 consisting of a front mold sealing surface and a gasket wall approximately 1.7 mm in height. The gasket piece remaining after cutting forms the "rear half-gasket" 5 which consists of a rear mold sealing surface and a gasket wall approximately 8.3 mm in height.

Figure 4:
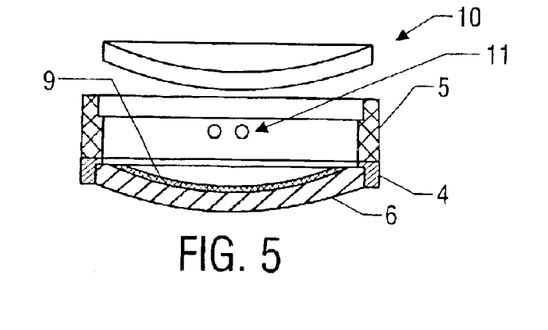
FIG. 4 is a side view of the front mold 6, the front "half-gasket" 4, useful in accordance with the present invention, and a lower rear mold 7. The rear mold casting surface has a curvature approximating the casting surface curvature of the front mold such that the cavity containing the liquid photochromic casting composition 8 is of generally uniform thickness when these components are assembled and the composition is gelled.

A front glass single vision mold with a 6 diopter concave surface radius of curvature was seated into the sealing area of the "front half-gasket. Approximately 10 grams of a photochromic dye-containing composition (see Table 1) was poured onto the mold. A second glass mold with a 6 diopter convex surface curvature was then placed on the 1.7 mm high wall. The resulting assembly consisted of a 6 diopter concave front mold and a 6 diopter convex rear mold separated by a gap of 1.7 mm, the gap being filled with the photochromic dye-containing composition (see FIG. 4).

The Gelled Photochromic Dye-Containing Front Layer

TABLE 1

Photochromic Dye-Containing Composition

| Component | Weight percentage |
|---|---|
| Prepolymerized SunSensors Monomer: | 94.52 |
| Dipentaerythritol pentaacrylate: | 5.00 |
| 1-dodecanethiol: | 0.30 |
| Ethyl 2,4,6-trimethylbenzoylphenyl phosphinate: | 0.18 |

Note: SunSensors Monomer is a proprietary composition of Corning, Incorporated. The monomer composition contains photochromic dyes. The monomer was prepolymerized to a viscosity of approximately 400 centistokes prior to combining the prepolymerized monomer in the composition above.

The front half-gasket assembly just described was exposed to the light produced by a Fusion "V" bulb filtered with a single layer of Edmund # 39,426 ultraviolet filter film. The arrangement was such that the light entered the assembly through the convex rear mold. The intensity of the light was approximately 1.0 milliwatt/cm$^2$ measured with an International Light IL1400 radiometer equipped with a 405 nm narrow bandwidth filter. Exposure time was 8 minutes.

After exposure, the convex rear mold was separated from the assembly. The front half assembly then consisted of the front half-gasket, the concave front mold, and a uniform gel layer of approximately 1.7 mm thickness.

Figure 5:
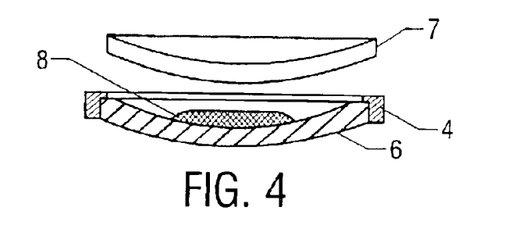
FIG. 5 is a side view of an assembly useful for making the composite lenses of the present invention once the rear mold 7 has been removed from the photochromic gel 9 still attached to the front mold 6. The rear "half-gasket" 5 is mated with the front "half-gasket" 4 to separate the front mold containing the gelled photochromic composition, and the rear mold 10 of appropriate curvature to form the rear surface of the completed composite lens. Holes 11 are provided for filling the resulting cavity with the non-photochromic composition.
Figure 6:
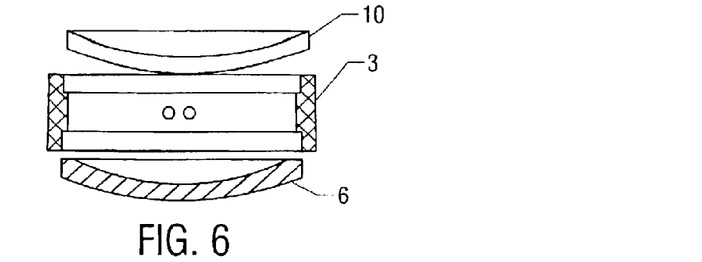
FIG. 6 is an exploded side view of an assembly useful to form the shape of a non-photochromic gel to be used in one aspect of the present invention. The assembly is formed by a front mold 6, a rear mold 10, and a suitable gasket 3. Holes may be provided in the gasket for the injection of the non-photochromic composition.
Figure 7:
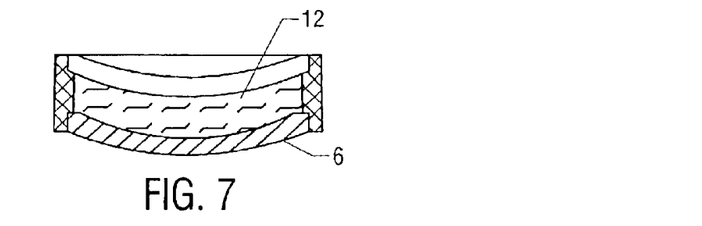
FIG. 7 is a side view of the assembly of FIG. 6 containing the liquid non-photochromic composition 12 ready to be gelled.
Figure 8:
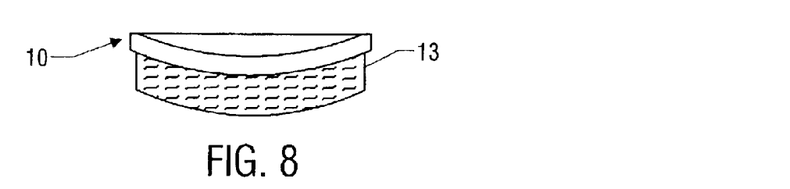
FIG. 8 is a side view of the gelled non-photochromic composition 13 attached to the rear mold 10 after the front mold 6 and gasket 3 have been removed.
Figure 9:
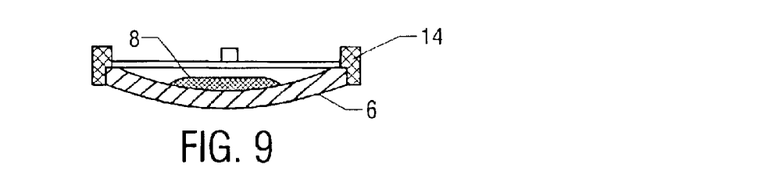
FIG. 9 is a side view of the front part of the assembly used to form the front photochromic-containing layer of the composite lens. A front casting mold 6 of the same surface geometry as the front mold 6 used in FIG. 6 is fitted to a short walled gasket 14. The liquid photochromic composition 8 is shown placed on the surface of the mold.
Figure 10:
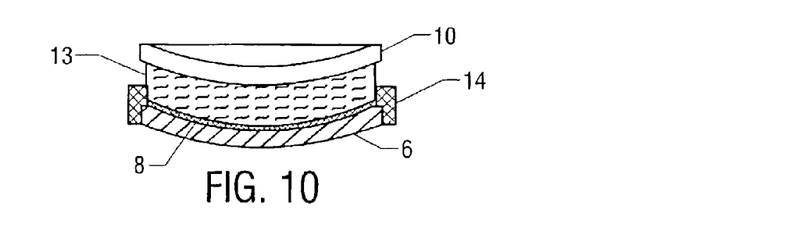
FIG. 10 is a side view of the completed assembly consisting of the gel 13 and rear mold 10 of FIG. 8 and the front portion shown in FIG. 9 positioned such that the photochromic composition is placed in contact with the gel 8 and fills the cavity between the surface of the gel 13 and the front mold 6.
Figure 11:
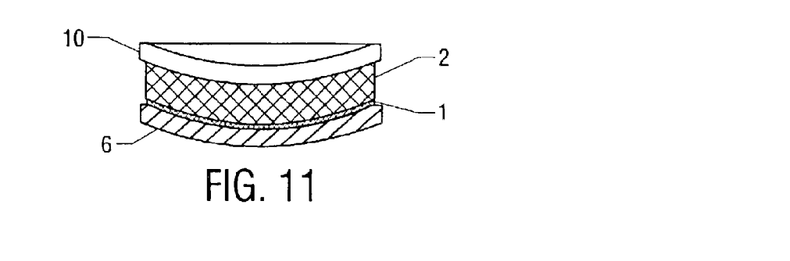
FIG. 11 is a side view of the assembly shown in FIG. 10 after the non-photochromic gel 2 and the liquid photochromic compositions 8 have been cured together. The result is the fully cured photochromic front layer 1 and the fully cured non-photochromic rear layer 2 on their respective molds after the gasket 14 has been removed.
Figure 12:
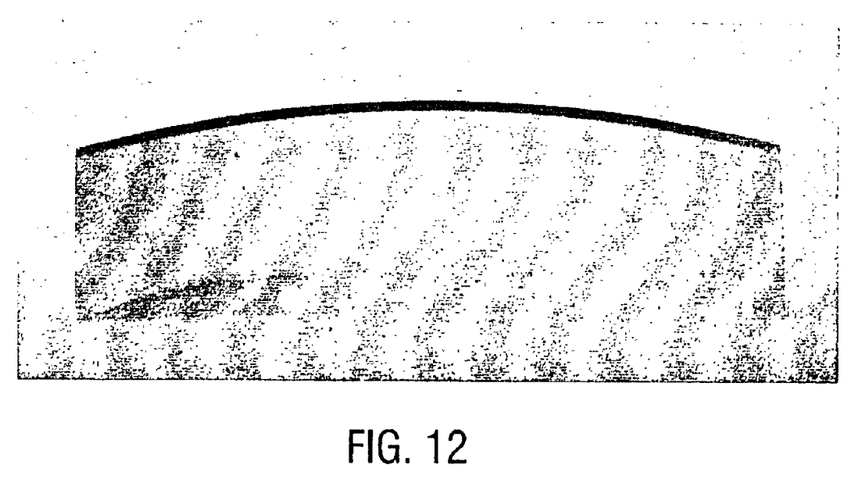
FIG. 12 is a scanned photograph showing a side view of an ophthalmic lens containing a distinct phase boundary between adjacent fully cured layers. The top (outer) layer contains a mixture of three photochromic dyes. The overall plate height of the lens is about 2 cm, and the thickness of the photochromic layer is about 1 mm.

The rear half-gasket was prepared by drilling two small holes for the introduction of the non-photochromic casting composition (FIG. 5). The rear half-gasket was then placed onto the front half assembly such that the cut surfaces of the gasket wall were in contact. A 6 diopter convex glass rear mold was placed on the rear mold sealing surface of the rear half-gasket, and the entire assembly was clamped together with a clamp configured such that light could pass through the rear mold into the assembly (FIG. 5).

A non-photochromic (rear layer) polymerizable composition (Table 2) was injected through the drilled holes in the rear half-gasket, such that the cavity formed between the photochromic gel and the convex rear mold was filled with the composition. The holes were sealed by means of adhesive tape. The assembly was then exposed to the unfiltered light from a Fusion "V" lamp such that the light entered from the rear mold of the assembly. Light intensity was approximately 4.0 mW/cm$^2$ measured by the IL 1400 apparatus mentioned previously. Exposure time was 15 minutes. The assembly was then turned over and exposed to "V" lamp light filtered with the previously mentioned Edmund ultraviolet filter at an intensity of 1 mW/cm$^2$ for an additional 67 minutes. The arrangement was such that the light entered the assembly through the front concave mold.

At the conclusion of the exposure period, the assembly was removed from the source of illumination, the clamp and the gasket pieces were removed, as were the molds. The resulting composite lens consisted of a uniform photochromic layer approximately 1.7 mm thick attached to a uniform non-photochromic layer approximately 8 mm thick. The font curvature was approximately +6 diopters, the rear approximately −6 diopters. When exposed to sunlight, the lens had good photochromic response with uniform color and density.

Additional examples of photochromic dye-containing compositions useful in accordance with the preferred method and articles follow in Examples 1–4. It should be understood that the compositions shown in Examples 1–4 also can be used as the non-photochromic polymerizable compositions by omitting the photochromic dye, however, it is preferred to use harder, more abrasion-resistant resins such as the polyesters or bisallyl carbonates as the non-photochromic composition, as shown in Example 5 and Table 2.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Methacrylate-Based Photochromic Layer

| Component | Percentage |
|---|---|
| tridecyl methacrylate | 24% |
| 1,12-dodecanediol dimethacrylate | 24% |
| trimethylolpropane trimethacrylate | 12% |
| polyethyleneglycol dimethacrylate | 30% |
| tetraethyleneglycol dimethacrylate | 10% |
| | =100% |
| photoinitiator | 0.06%* |
| photochromic dye, e.g., naphthopyrans, naphthoxazines | 0.01–0.2% |

*can be 0.005–0.08% photoinitiator and/or 0.1–1.0% thermal initiator

Example 2

Urethane Dimethacrylate-Based Photochromic Layer

| Component | Percentage |
|---|---|
| aliphatic diurethane dimethacrylate | 79.5% |
| tridecyl methacrylate | 8% |
| 1,12-dodecanediol dimethacrylate | 8% |
| trimethylolpropane trimethacrylate | 4% |
| 2,2-diallylbisphenol-A | 0.5% |
| | =100% |
| photoinitiator | 0.06%* |
| photochromic dye, e.g., naphthopyrans, naphthoxazines | 0.01–0.2% |

*can be 0.005–0.08% photoinitiator and/or 0.1–1.0% thermal initiator

Example 3

Polyester-Based Compositions For Either Layer

| Component | Percentage |
| --- | --- |
| Unsaturated polyester (an alkyd resin, preferably including step-growth polymerized dicarboxylic acids, such as maleic and/or fumaric reacted with one or more polyols, such as hydrogenated bisphenol-A). | 61% |
| styrene or other polyester diluent | 19% |
| α-methyl styrene | 10% |
| trimethylolpropane trimethacrylate | 10% |
| | 100% |
| photoinitiator | 0.05–0.48% |
| photochromic dye | 0.01–0.2% |

TABLE 2

Non-Photochromic Polymerizable Composition

| Component | Percentage |
| --- | --- |
| Silmar SIL95DA-1216 Resin | 77.36 wt. % |
| Ethylene glycol dimethacrylate | 10.93 wt. % |
| Diallyl phthalate | 4.80 wt. % |
| Dipentaerythritol pentaacrylate | 3.61 wt. % |
| Methyl methacrylate | 2.33 wt. % |
| Vinyl triacetoxysilane | 0.60 wt. % |
| 2-[2-hydroxy-3,5-di-(1,1-dimethylbenzyl)phenyl]-2H-benzotriazole | 0.27 wt. % |
| Ciba Specialty Chemicals Irgacure 1850 | 0.10 wt. % |
| Red and Blue dyes | trace |

Notes: Silmar SIL95DA-1216 is an unsaturated polyester resin solution containing approximately 70 wt. % unsaturated polyester alkyd resin and approximately 30 wt. % styrene.

Notes: Silmar SIL95DA-1216 is an unsaturated polyester resin solution containing approximately 70 wt. % unsaturated polyester alkyd resin and approximately 30 wt. % styrene.

Ciba Specialty Chemicals Irgacure 1850 is a mixture of: 50 wt. % bis(2,6-dimethoxybenzoyl)-2,4-,4-trimethylpentyl phosphine oxide and 50 wt. % 1-hydroxycyclohexyl phenyl ketone.

Subsequent to the lens produced as described above, other lenses have been made following the same basic procedure with front curvatures ranging from 0.5 diopters to 8 diopters, photochromic layers from 1.25 to 2.2 mm, and overall lens thicknesses from approximately 10 mm to 16 mm. Single vision, flat top bifocal, and progressive addition lenses have also been cast.

When making lenses of various front curvatures, the rear convex mold curvature used in making the photochromic gel layer is approximately matched with the curvature of the front concave mold to give a generally uniform layer thickness. Rear molds used for this purpose have been made from various plastic materials (e.g., PTFE film, cast plastic compositions, glass).

An in-mold coating (approximately 2 or 3 microns) has also been applied to the surface of the front concave mold and partially polymerized (see U.S. Pat. No. 4,544,572) prior to fitting the mold to the sealing surface of the front half-gasket. In this way, a strongly adhering scratch resistant coating is bonded to the front photochromic layer of the composite lens.

Semifinished composite lenses which have been made using the procedure outlined above have been successfully processed to prescription power using equipment suitable for processing CR-39 type lenses. They have demonstrated the capability of passing the FDA impact test, and have resisted delamination during thermal shock testing (alternating cycles of immersion in boiling water and ice water).

Second Embodiment—Rear Lens-Forming Composition Gelled

To prepare the gel-form intermediate from the rear lens-forming composition, a front glass single vision mold with a 6 diopter concave surface radius of curvature (the front mold) was seated into the sealing area of a gasket with an inside wall thickness of approximately 14 mm. The composition described in Table 3 was poured into this assembly. A second glass mold with a 6 diopter convex surface curvature (the rear mold) was then placed on top of the gasket to form a closed assembly. The assembly was then exposed to the light produced by a Fusion "V" bulb. The arrangement was such that the light entered the assembly through the convex rear mold. The intensity of the light was approximately 4.0 milliwatts/cm$^2$ measured with an International Light IL1400 radiometer equipped with a 405 nm narrow bandpass filter. Exposure time was 13 minutes.

After exposure, the gasket was removed from the assembly, and the front mold was carefully separated from the gelled composition. The rear mold remained attached to the gel.

TABLE 3

Rear Layer: Gel-Form Polymerizable Composition

| Component | Percentage |
| --- | --- |
| Silmar SIL95DA-1216 Resin | 72.01 wt. % |
| Ethylene glycol dimethacrylate | 10.19 wt. % |
| Alpha-methylstyrene | 7.40 wt. % |
| Diallyl phthalate | 4.48 wt. % |
| Dipentaerythritol pentaacrylate | 3.40 wt. % |
| Methyl methacrylate | 2.19 wt. % |
| 2-[2-hydroxy-3,5-di-(1,1-dimethylbenzyl)phenyl]-2H-benzotriazole | 0.25 wt. % |
| Ciba Specialty Chemicals Irgacure 1850 | 0.08 wt. % |
| Red and Blue dyes | trace |

Notes: Similar SIL95DA-1216 is an unsaturated polyester resin solution containing approximately 70 wt. % unsaturated polyester alkyd resin and approximately 30 wt. % styrene.

Ciba Specialty Chemicals Irgacure 1850 is a mixture of: 50 wt. % bis(2,6-dimethoxybenzoyl)-2,4-trimethylpentyl phosphine oxide and 50 wt. % 1-hydroxycyclohexyl phenyl ketone.

A second front mold, also of 6 diopter concave curvature, was fitted to a gasket having an inner wall height of approximately 1.7 mm. Approximately 10 grams of a photochromic dye-containing composition (see Table 4) was poured into the mold. The gel-form intermediate was then placed into the mold and gasket such that the exposed surface of the gel was in contact with the photochromic dye-containing composition and the open end of the gasket, thus forming a closed assembly. This assembly was then exposed to the light of Fusion "V" lamp with intensity of approximately 4.0 mw/cm$^2$ as previously described for a period of about 45 minutes. The light entered the assembly through the convex rear mold attached to the gel-form. The gel-form contains a UV absorbing material which helps shield the photochromic layer from wavelengths shorter than about 390 nm. This allows for protection of the photochromic dye during curing, but allows for the passage of wavelengths of approximately 400 to 450 nm to cure the photochromic composition.

TABLE 4

Photochromic Dye-Containing Polymerizable Composition

| Component | Percentage |
|---|---|
| Prepolymerized SunSensors Monomer: | 94.52 wt. % |
| Dipentaerythritol pentaacrylate: | 5.00 wt. % |
| 1-dodecanethiol: | 0.30 wt. % |
| Ethyl 2,4,6-trimethylbenzoylphenyl phosphinate: | 0.18 wt. % |

Note: SunSensors Monomer is a proprietary composition of Corning, Incorporated. The monomer composition contains photochromic dyes. The monomer was prepolymerized to a viscosity of approximately 400 centistokes prior to use in the composition above.

To assure complete cure of the photochromic layer, the assembly was inverted after 45 minutes and exposed to the light produced by a Fusion "V" bulb filtered with a single layer of Edmund # 39,426 ultraviolet filter film. This arrangement was such that the light entered the assembly through the front mold. The intensity of the light was approximately 1.0 milliwatt/cm$^2$ using the previously described radiometer apparatus. Exposure time was approximately 45 minutes.

At the conclusion of the exposure period, the assembly was removed from the source of illumination and the gasket and molds were removed from the polymerized lens. The resulting composite lens consisted of a uniform front photochromic dye-containing layer approximately 1.7 mm thick attached to a uniform rear non-photochromic layer approximately 13 mm thick. The front curvature was approximately +6 diopters, the rear approximately −6 diopters. When exposed to sunlight, the lens had good photochromic response with uniform color density.

Subsequent to the lens produced as described above, other lenses were made following the same basic procedure with front curvatures ranging from 0.5 diopters to 8 diopters, photochromic dye-containing front layers ranging in thickness from about 1.0 to 2.0 mm, and overall lens thicknesses from approximately 10 mm to 16 mm.

An in-mold coating (approximately 2 or 3 microns in thickness) has also been applied to the surface of the front concave mold and partially polymerized (see U.S. Pat. No. 4,544,572) prior to fitting the mold to the 1.7 mm gasket and placing the photochromic dye-containing composition into the mold assembly. In this way, a strongly adhering, scratch-resistant coating is bonded to the front photochromic dye-containing layer of the composite lens. This coating may also contain UV-absorbing compounds that absorb light at wavelengths which can degrade the photochromic dye, but allow light to pass which effectively activates the dye. In this way, the lifetime of the lens can be increased.

The choice of photoinitiator in the front or rear layer composition can be made to include a combination of a shorter wavelength-sensitive photoinitiator with a photoinitiator that is sensitive to both shorter and longer wavelengths. This is the case with Ciba Specialty Chemicals Irgacure 1850. When the curing light passes from the front or rear mold in a direction to pass first through the gel-form composition (front or rear layer) during the initial gel-forming stage, the gelled layer surface contacting the mold hardens more than the gelled surface farther away from the source of curing light, so that the mold separates quite easily at the gelled surface farther from the curing light. This ease of separation can be further enhanced by the treatment of the front or rear mold with a mold release material, such as Relisse® Casting Release Polymer from Nanofilm, Ltd.

Semifinished composite lenses made using the procedures outlined above have been successfully processed to prescription power using equipment suitable for processing CR-39 type lenses. They have demonstrated the capability of passing the FDA impact test, and have resisted delamination during thermal shock testing (alternating cycles of immersion in boiling water and ice water).

The Non-Photochromic Dye-Containing Rear Layer

The preferred compositions of the rear layer (inner or eye-facing ophthalmic lens layer) of the present invention includes an unsaturated polyester resin in an amount of about 25% to about 70% (excluding monomer diluents, e.g., styrene) or about 40% to about 95% of the composition if calculated to include a diluent monomer, e.g., styrene; preferably about 35% to about 60% by weight unsaturated polyester calculated without diluent monomer, as disclosed in this assignee's U.S. Pat. No. 6,099,123, hereby incorporated by reference. Unsaturated polyesters are well known and can be manufactured by the reaction of one or more polyols with one or more polycarboxylic acids, with olefinic unsaturation being provided by one or more of the reactants, usually the acid. The resultant unsaturation in the polyester enables these resins to form thermosetting, cross-linked reaction products with compounds that contain olefinic double bonds, such as styrene, methyl methacrylate, and the like. Commercially available unsaturated polyesters which can be used in accordance with the present invention include the reaction products of one or more saturated or unsaturated dicarboxylic acids, or their ester-forming derivatives, with a saturated or a vinyl-group-containing polyhydric alcohol.

Examples of suitable unsaturated dicarboxylic acids for reaction to form the unsaturated polyester include maleic acid, fumaric acid, citraconic acid, itaconic acid, meconic acid, and anhydrides thereof, lower alkyl esters or acid halides thereof.

Examples of suitable saturated dicarboxylic acids for reaction to form the unsaturated polyester include aliphatic dicarboxylic acids, such as malonic acid, succinic acid, glutaric acid, adipic acid, suberic acid, azelaic acid, pimelic acid, or sebacic acid; and aromatic dicarboxylic acids, such as orthophthalic acid, terephthalic acid, isophthalic acid, m,p-diphenyl dicarboxylic acid, and diphenic acid; and anhydrides of these acids, such as phthalic anhydride and maleic anhydride, lower alkyl esters or acid halides of these acids, and mixtures thereof.

Examples of suitable polyols for reaction with the dicarboxylic acid to form the unsaturated polyester include ethylene glycol, propylene glycol, butylene glycols, neopentyl glycol, dipropylene glycol, and the poly(ethylene glycol)s of the foregoing, such as diethylene glycol, triethylene glycol, tetraethylene glycol, and mixtures thereof.

The base polyester resin used in the compositions and methods of the present invention should have a number average molecular weight in the range of about 1,000 to about 5,000, preferably about 1,500 to about 4,000, and should be without haze. Suitable unsaturated polyesters having such properties are well known in the art, as disclosed in this assignee's U.S. Pat. No. 5,694,195, hereby incorporated by reference.

As examples of suitable unsaturated polyester resins, the base polyester can be a polyester formed by the reaction of propylene glycol, phthalic anhydride and maleic anhydride, such as the "S-40" unsaturated polyester disclosed in Bright U.S. Pat. No. 5,319,007. The composition disclosed in the Bright patent includes a phenoxyethyl acrylate, which is preferably not included as an acrylate additive in accordance with the present invention. Another suitable unsaturated polyester is formed by the reaction of maleic anhydride, orthophthalic anhydride and propylene glycol, such as "Aropol L-2506-15" of Ashland Chemical Co., also disclosed in the above-identified Bright U.S. Pat. No. 5,319,007, hereby incorporated by reference.

The preferred polyester resins useful in accordance with the present invention include the reaction products of one or more acids or anhydrides selected from phthalic acid, isophthalic acid, maleic acid, phthalic anhydride, maleic anhydride, and particularly mixtures of two or more of such acids or anhydrides, with a polyol selected from ethylene glycol, propylene glycol, diethylene glycol, dipropylene glycol, and neopentyl glycol, preferably two or more of those glycols, having a number average molecular weight in the range of about 1,500 to about 4,000.

One of the most difficult problems encountered in attempting to formulate a polyester resin-based composition into a suitable ophthalmic lens formulation is that of providing the cast and cured composition with sufficient optical clarity, or freedom from optical distortion. In conventional procedures for the casting of plastic ophthalmic lenses, the reactants used to form the resin are introduced between spaced apart glass or metal mold surfaces. The mold sections are sealed together about their inner periphery by means of a non-reactive, resilient gasket or retainer ring. Since exothermic materials are employed, the mold outer surfaces are immersed in a cooling fluid, e.g., water, or otherwise cooled to dissipate the heat of polymerization and cross-linking from the mold cavity, and to maintain an optimum polymerization and curing temperature. During the polymerization reaction, particularly prior to gelation and cross-linking, convection currents are created in the resin, while the resin is in the liquid state, as a result of a substantial temperature differential between the polymerizing resin in the mold cavity and the coolant that surrounds the mold. These convection currents tend to freeze into the polymer as polymerization proceeds through gelation and curing, resulting in striation or visible "waves" in the cured polyester resin. Lenses that contain such visible "waves" are unacceptable due to extensive optical distortion or optical non-uniformity.

The problem of obtaining rapid and uniform photocure while simultaneously providing relatively high levels of ultraviolet absorbency needed for customers desiring a UV cutoff (e.g., less than 5% transmission at 380 nm wavelength for a semifinished lens processed to 1.5 mm thickness) and improved weathering characteristics is solved in accordance with a preferred embodiment of the present invention by the use of photoinitiators having at least some activity at wavelengths above 380 nm. Photoinitiators that are active at a wavelength above 380 nm include benzoyl phosphine oxides; xanthones and thioxanthones; visible light photoinitiators, including: (a) fluorone dye/onium salt/amine systems, (b) dye/borate systems, and (c) borate photoinitiators; benzyl dialkyl ketals; and substituted morpholino ketones. In this manner, UV absorbers capable of absorbing light at wavelengths of 380 nm and below will provide the desired UV cutoff, while the photoinitiator(s) having activity at wavelengths above 380 nm will be activated (generate free radicals) for rapid and uniform photocure of the polyester resin. Preferred initiators include phosphinates, phosphine oxides, particularly substituted phosphine oxides, and mixtures of one or more phosphinates and/or phosphine oxides with α-hydroxy ketones, such as: 2,4,6-trimethylbenzoyldiphenylphosphine oxide (BASF Lucirin TPO); ethyl 2,4,6-trimethylbenzoylphenylphosphinate (BASF Lucirin TPOL); bis(2,6-dimethoxybenzoyl)-2-4-,4-trimethylpentyl phosphine oxide; bis(2,4,6-trimethylbenzoyl)phenyl phosphine oxide; a 50%/50% by weight mixture of 2,4,6-trimethylbenzoyldiphenylphosphine oxide and 2-hydroxy-2-methyl-1-phenylpropan-1-one (Ciba Darocur 4265); a 25%/75% by weight mixture of bis(2,6-dimethyoxybenzoyl)-2-4-,4-trimethylpentyl phosphine oxide and 2-hydroxy-2-methyl-1-phenylpropan-1-one (Ciba Irgacure 1700); a 25%/75% by weight mixture of bis(2,6-dimethyoxybenzoyl)-2-4-,4-trimethylpentyl phosphine oxide and 1-hydroxycyclohexyl phenyl ketone (Ciba CGI 1800); and a 50%/50% by weight mixture of bis(2,6-dimethyoxybenzoyl)-2-4-,4-trimethylpentyl phosphine oxide and 1-hydroxycyclohexyl phenyl ketone (CGI 1850).

Other suitable photoinitiators include 1-hydroxycyclohexyl phenyl ketone (Ciba Irgacure 184); 2-benzyl-2-N,N-dimethylamino-1-(4-morpholinophenyl)-1-butanone (Ciba Irgacure 369); a mixture of 50% by weight 1-hydroxycyclohexyl phenyl ketone and 50% by weight benzophenone (Ciba Irgacure 500); 2,2-dimethyoxy-2-phenyl acetophenone (Ciba Irgacure 651); 2-methyl-1-[4-(methylthio)phenyl]-2-morpholino propan-1-one (Ciba Irgacure 907); 2-hydroxy-2-methyl-1-phenylpropan-1-one (Ciba Darocur 1173); bis(2,6-dimethoxybenzoyl)-2-4-,4-trimethylpentyl phosphine oxide (Ciba CGI 403); 4-(2-hydroxyethoxy)phenyl-2-(2-hydroxy-2-methylpropyl) ketone (Ciba Irgacure 2959); bis(η5-2,4-cyclopentadien-1-yl)-bis-[2,6-difluoro-3-(1H-pyrrol-1-yl)phenyl titanium (Ciba Irgacure 784 DC); isobutyl benzoin ether (Stauffer Vicure 10); methyl benzoylformate (Stauffer Vicure 55); a mixture of 2-butoxy-1,2-dipehnylethanone and 2-(2-methylpropoxy)-1,2-diphenylthanone (Sartomer Esacure EB3); 2,2-diethoxyacetophenone (Upjohn DEAP); 2,2-di-sec-butoxyacetophenone (Upjohn Uvatone 8301); diethoxyphenyl acetophenone (Upjohn Uvatone 8302); a mixture of 70% by weight oligo 2-hydroxy-2-methyl-1-[4-(1-methylvinyl phenyl) propanone] and 30% by weight 2-hydroxy-2-methyl-1-phenyl propan-1-one (Sartomer Esacure KIP 100 F); a mixture of isopropyl thioxanthone and a photoactivator such as ethyl 4-(dimethylamino) benzoate (Sartomer Esacure ITX and Esacure EDB, respectively); a mixture of isopropyl thioxanthone and 2,4,6-trimethylbenzophenone and 4-methylbenzophenone (Sartomer Esacure X 15); a mixture of 2,4,6-trimethylbenzophenone and 4-methylbenzophenone (Sartomer Esacure TZT); a mixture of 30% by weight oligo 2-hydroxy-2-methyl-1-[4-(1-methylvinyl phenyl) propanone] and 70% by weight of a mixture of 2,4,6-trimethylbenzophenone and 4-methylbenzophenone (Sartomer Esacure KT 37); fluorone dye/onium salt/amine photoinitiator systems, such as those available from Spectra Group Ltd., and borate and dye/borate systems, such as those available from Ciba. If it is unnecessary to include a UV absorber in the polyester lenses, or if a UV absorber is included that absorbs light having a wavelength cutoff below 380 nm, polymerization can be initiated with any of the above-mentioned photoinitiators, particularly the benzoin ethers; hydroxyl alkyl phenyl ketones; substituted acetophenones; and the sulfonic esters of alpha-hydroxy benzoin derivatives. The use of such photoinitiators in a formulation made to be very reactive, such that the amount of photoinitiator can be minimized, helps to reduce coloration of the lens during cure. Together with trace amounts of a blue and red dye, the lens can be made to be "water-white".

In addition to the photoinitiator(s), it has been found that the unsaturated polyester composition, in the preferred embodiment, also includes an additive selected from the group consisting of an allylic ester, an acrylate monomer, and mixtures thereof, to provide improved tint speed and/or improved optical uniformity. Best results are achieved with a combination of an allylic ester and an acrylate monomer, particularly since the allylic ester also functions to increase the impact strength of the cross-linked polymer network, and the acrylate additionally functions to increase the abrasion resistance. Any low color allylic ester and/or any low color acrylate monomer or oligomer is suitable as an optional additive in accordance with the preferred embodiment of the present invention.

Suitable allylic esters include monoallylic esters, diallylic esters and triallylic esters, preferably an allylic ester selected from the group consisting of diallyl phthalate; diethylene glycol bis(allyl carbonate); triallyl cyanurate; diallyl diphenate; and mixtures thereof. Other suitable allylic esters include allyl acrylate; allyl benzene; triallyl isocyanurate; diallyl maleate; diallyl diglycollate; dimethallyl maleate; allyl benzoate; diallyl adipate; and mixtures thereof. The allylic ester, when incorporated as a composition additive, should be included in an amount in the range of about 1% to about 20%, based on the total weight of the polyester-based lens composition, preferably about 2% to about 10% by weight; and more preferably about 4% to about 10% by weight, with best results achieved at about 4% to about 8% by weight.

Suitable acrylic monomers include monoacrylates, diacrylates, triacrylates, tetraacrylates, pentaacrylates, and the higher poly-functional acrylates. The preferred acrylate monomer is selected from the group consisting of methyl methacrylate; ethylene glycol diacrylate; ethylene glycol dimethacrylate; polyethylene glycol diacrylate; polyethylene glycol dimethacrylate; 1,6 hexanediol diacrylate; ethoxylated bisphenyl A diacrylate; ethoxylated bisphenyl A dimethacrylate; trimethylolpropane polyoxyethylene triacrylate; dipentaerythritol pentaacrylate; bis(4-methacryloylthiophenyl) sulfide and mixtures thereof.

Other suitable monofunctional acrylates include alkyl and substituted alkyl acrylates and methacrylates, such as ethyl acrylate; cyclohexyl methacrylate; 2-hydroxyethyl methacrylate; 3-hydroxypropyl acrylate; and mixtures thereof. Additional suitable monofunctional acrylates and methacrylates include any haloalkyl acrylate and methacrylate, such as alpha-bromoethyl acrylate; alpha-chloroethyl acrylate; chloromethyl methacrylate; 2-bromoethyl methacrylate; and mixtures thereof.

Aryl acrylates and methacrylates also are suitable as optional additives for the polyester-based compositions, such as 2-naphthyl-methacrylate; para-tolyl acrylate; and mixtures thereof. Also suitable are the haloaryl acrylates and methacrylates, such as para-chlorophenyl methacrylate; meta-bromophenyl acrylate; 2,4,6-tribromophenyl acrylate; and mixtures thereof. The benzyl acrylates and methacrylates which can be used as composition additives, in accordance with the present invention, include benzyl acrylate; benzyl methacrylate and their derivatives, such as para-chlorobenzyl methacrylate; meta-methoxybenzyl methacrylate; para-ethylbenzyl acrylate; and mixtures thereof.

Other suitable polyfunctional acrylates and methacrylates include the polyol diacrylates and dimethacrylates, such as neopentyl glycol diacrylate; polyethylene glycol acrylates, methacrylates, and dimethacrylates, such as the acrylate and methacrylate esters of diethylene glycol, trimethylene glycol, tetraethylene glycol, and the like; thiodiethylene glycol dimethacrylate; and mixtures thereof. Additional useful polyfunctional acrylates and methacrylates include the polyol polyacrylates and polymethacrylates, such as pentaerythritol triacrylate; glycerol triacrylate; trimethylolpropane triacrylate; tris(2-hydroxyethyl) isocyanurate trimethacrylate; and the aliphatic and aromatic monofunctional and polyfunctional urethane acrylates and methacrylates; and mixtures thereof.

The acrylate monomer, when incorporated into the polyester composition, should be included in an amount in the range of about 1% to about 50%, based on the total weight of the polyester-based lens composition, preferably about 2% to about 40% by weight; and more preferably about 5% to about 35% by weight, with best results achieved at about 10% to about 25% by weight.

When the composition is used to first make a rear layer gel-form, it is preferred to use an exotherm depressant to extend the time the composition is in a suitable gel state for ease of removal of the front mold prior to assembling the gel-form such that it is contact with the photochromic-containing composition, and prior to completing the simultaneous cure of the two layers. Examples of exotherm depressant compounds suitable for this purpose include alpha-methyl styrene, terpinolene, gamma-terpinene, and dilauryl thiopropionate. Examples illustrating the use of exotherm depressants in unsaturated polyester compositions suitable for ophthalmic lens manufacturing can be found in this Assignee's U.S. Pat. Nos. 5,694,195; 5,852,112; 5,886,764; and 6,099,123, hereby incorporated by reference. The preferred exotherm depressant is alpha-methylstyrene in an amount of about 2 to about 10 weight percent.

The resulting lens will have a relatively high index of refraction (greater than 1.50), a relatively low density (less than 1.38 grams/cc), and an acceptable ABBE value (greater than 30). The lens will have sufficient hardness to be able to be surfaced with commonly used optical laboratory equipment. Additionally, by the addition of various ultra-violet absorbing materials capable of absorbing UV radiation having a wavelength below about 380 nm (such as Cyanamid Cyasorb UV5411; Ciba Geigy Tinuvin 234; and the like) and color-correcting dye(s), the lens can be made "water white" and will not appreciably yellow during exposure to sunlight.

Activating the photoinitiator, in accordance with the preferred embodiment, is accomplished using radiation with wavelengths above 380 nm, but below that wavelength at which the photoinitiators are no longer active. For the system described, an emission line of approximately 405 nm (such as that obtained by a Fusion Systems "V" bulb) is very satisfactory.

Intensity of the UV light is one parameter that can be varied over a wide range to produce the rapid reaction and exotherm such that optical uniformity is achieved. Optical uniformity in polyester lenses can be obtained using the photocuring and photoinitiator(s) of the present invention so long as the polyester-based composition gels in about 7 minutes or less, and preferably in about 5 minutes or less. A number of other parameters can be varied while achieving gelation within about 7 minutes including the peak exotherm temperature; time to reach peak exotherm temperature; time that the composition is photopolymerized and photocured with the UV light; photoinitiator concentration; whether or not an exotherm depressant is included in the composition (and its concentration); and the wavelength cutoff of the UV absorber (at a lower wavelength cutoff, less UV light intensity is required since the absorber blocks less UV light). Preferably, a light intensity of at least about 300 microwatts/cm² is used to achieve rapid gelation, more preferably about 500 microwatts/cm² to about 7,000 microwatts/cm². Also, it is preferred that the time to reach peak exotherm temperature (which preferably is higher than about 150° F. (66 ° C.)) be less than about 1 hour, and more preferably less than about 45 minutes.

Another suitable formulation for the rear (eye-facing) lens layer of the first embodiment is comprised of:

TABLE 5

Rear lens layer formulation

| Component | Weight % |
| --- | --- |
| Unsaturated polyester resin (Silmar D-910 containing 30% styrene diluent) | 77.54 (w/diluent) |
| Diallyl phthalate | 7.71 |
| Ethylene glycol dimethacrylate | 6.00 |
| Methyl methacrylate | 3.77 |
| Styrene | 4.68 |
| Cyasorb UV-5411 | 0.10 |
| Tinuvin 234 | 0.08 |
| Darocur 4265 | 0.12 |
| Blue dye | trace |
| Red dye | trace |
| α-methyl styrene | 0 |

The resin, Silmar D-910, is a clear, unsaturated polyester ortho resin intermediate formed from the reaction of phthalic anhydride, maleic anhydride, propylene glycol, ethylene glycol and diethylene glycol with a number average molecular weight of about 2,200. It contains approximately 30% by weight styrene as a diluent monomer. The polyester resin serves as the basis for the formulation.

The other ingredients utilized are believed to perform the following functions: Diallyl phthalate is added to increase tintability of the final lens product. Ethylene glycol dimethacrylate is used to promote rapid curing, and together with methyl methacrylate, contributes to the overall hardness of the lens. Styrene is added to adjust the index of refraction and as a diluent monomer for further viscosity reduction. Cyasorb UV-5411 and Tinuvin 234 are used for conveying strong ultraviolet absorbency to the final lens product and to improve weathering characteristics of the lens. Darocur 4265 is the photoinitiator and has some reactivity at wavelengths above 380 nm. The blue and red dyes are used to adjust the final lens to a "water-white" color.

The components of the formulation are thoroughly mixed, with precaution taken to shield the mixing vessel from bright light. After filtration through a 1 micron filter, the formulation is poured into the lens mold assembly. Since many of the components are quite volatile, precautions must be taken to avoid much evaporation during the pouring process. The lens assembly configurations have been previously described. The gasket should be composed of a material chemically resistant to the formulations used. Glass molds, through which the curing radiation will pass, should be transparent and free from markings or other conditions which would interfere with light transmission through the formulation.

The lens assembly is then exposed to the curing radiation. The composition disclosed will cure best from a source of light with sufficient intensity in the wavelength region of 380 nm to 430 nm. A Fusion Systems, Inc. type "V" bulb has intense output at approximately 405 nm and 420 nm and is ideally suited for exposure, although other lamp types can also be used. Light from the lamp is diffused by means of a piece of sandblasted sheet glass or "opal" glass placed between the lamp and the lens assembly. In the first embodiment, the light is directed from the source to the rear convex mold, then through the composition.

The exposure intensity and time should be sufficient to initiate a rapid rate of polymerization and exotherm in order to achieve optical uniformity. The intensity of the "V" bulb light measured with a calibrated radiometer fitted with a narrow bandpass filter at 405 nm should be at least about 300 microwatts/cm², preferably at least 500 microwatts/cm². Higher intensity is even more desirable to obtain better optical and tint uniformity. Lower intensities will require somewhat longer exposure than higher intensities. A good practical value is approximately 4,000 microwatts/cm² for 30 minutes.

It is important to take precautions that the light is uniform over the lens surface. Intensity has an effect on base curvature of the completed lens, and variations in intensity will cause a non-uniformity of the curvature. Likewise, intensity can effect tint rate and non-uniformity of exposure could cause tint blotchiness.

After curing, the assembly is allowed to cool to an appropriate temperature of, e.g., about 200° F. (93 ° C.) or less, for ease of disassembly. Rear (inner lens) layers produced from the disclosed composition and cured as described have the following properties:

TABLE 6

Optical properties of rear lens material

| Index of refraction | 1.56 |
| --- | --- |
| Color | white |
| U.V. cutoff (5% transmission at 1.5 mm thickness) | >380 nm |
| Optical Uniformity | very good |
| Tint speed | fast |
| Density (grams/cc) | 1.24 |
| Impact strength (semifinished lens processed to 1.5 mm center thickness) | exceeds FDA requirements |

An additional formulation suitable for producing the rear lens non-photochromic layer for either the first embodiment or the second embodiment can be produced with the following components.

TABLE 7

Alternative rear lens formulation

| Component | Weight % |
| --- | --- |
| (Silmar SIL95DA-1009E alkyd resin containing 26% styrene diluent) | 68.76 (w/diluent) |
| Diallyl diphenate | 9.12 |
| Alpha-methyl styrene | 5.84 |
| Divinylbenzene | 5.35 |
| Dipentaerythritol pentaacrylate | 3.41 |
| Ethoxylated trimethylolpropane triacrylate | 3.21 |
| Styrene | 1.80 |
| Tinuvin 329 (Ciba Specialty Chemicals) | 1.58 |
| Tinuvin 292 (Ciba Specialty Chemicals) | 0.44 |
| Irganox 1076 (Ciba Specialty Chemicals) | 0.37 |
| Blue dye | Trace |
| Red dye | Trace |
| Irgacure 819 (Ciba Specialty Chemicals) | 0.12 |

When used as a gel-form of the second embodiment, exposure time to the light of the Fusion "V" bulb measured at approximately 4.0 milliwatts/cm², as previously described, is 2 minutes. The front mold can then be carefully separated from the gelled composition, and the process of making a composite photochromic lens is carried forward as previously described.

When this composition is used as the non-photochromic polymerizable composition of the first embodiment, the process previously disclosed for the composition of Table 2 is adequate for curing the composite lens.

When used in either the first or second embodiment, the polymerized non-photochromic layer exhibits an index of refraction of approximately 1.594.

An additional formulation suitable for the rear lens non-photochromic layer of the second embodiment can be produced containing the following components.

TABLE 8

Alternative rear lens formulation

| Component | Weight % |
|---|---|
| Silmar SIL95DA-1216 Resin | 74.31 |
| Ethylene glycol dimethacrylate | 10.42 |
| Diallyl phthalate | 4.58 |
| Alpha-methyl styrene | 4.00 |
| Dipentaerythritol pentaacrylate | 3.48 |
| Methyl methacrylate | 2.24 |
| Vinyltriacetoxysilane | 0.60 |
| Tinuvin 234 (Ciba Specialty Chemicals) | 0.26 |
| Irgacure 1850 (Ciba Specialty Chemicals) | 0.11 |
| Red and Blue dyes | trace |

When used as a gel-form, exposure time to the light of the Fusion "V" bulb measured at approximately 4.0 milliwatts/$cm^2$, as previously described, is 3 minutes. The front mold can then be carefully separated from the gelled composition, and the process of making a composite photochromic lens is carried forward as previously described.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention.

What is claimed is:

1. A method of manufacturing a composite photochromic ophthalmic lens having an index of refraction of at least about 1.49, without including a finished or semi-finished lens perform in a mold the method comprising:

providing against a front portion of a mold, the liquid first ophthalmic lens-forming composition including a polymerizable monomer, oligomer, or polymer and a photochromic compound;

filling a rear portion of the mold with a liquid second ophthalmic lens-forming composition, sufficiently different from the first ophthalmic lens-forming composition such that a distinct phase boundary results between the two compositions after complete curing of the two compositions, the second ophthalmic lens-forming composition including a polymerizable monomer, oligomer or polymer that is different from the polymerizable monomer, oligomer or polymer of the first ophthalmic lens-forming composition, such that the second ophthalmic lens-forming composition is in contact with the first lens-forming composition, wherein either the first or second ophthalmic lens-forming composition is gelled before adding the other ophthalmic lens-forming composition, in an ungelled state, to the mold; and curing the first and second ophthalmic lens-forming compositions simultaneously, while the first and second ophthalmic lens-forming compositions are in intimate contact.

2. The method of claim 1, wherein the second ophthalmic lens-forming composition is free of any photochromic dye.

3. The method of claim 2, wherein the first, photochromic material-containing ophthalmic lens-forming composition has a thickness of at least 0.4 mm after curing.

4. The method of claim 3, wherein the first, photochromic material-containing ophthalmic lens-forming composition has a thickness of about 0.4 mm to about 1 mm after curing.

5. The method of claim 1, wherein the first photochromic material-containing ophthalmic lens-forming composition has a thickness greater than about 1 mm after curing.

6. The method of claim 1, wherein the polymerizable monomer, oligomer, or polymer in the first and second ophthalmic lens-forming compositions are polymerizable by free radicals, both compositions include a photoinitiator, and the compositions are cured simultaneously by contact with radiation.

7. The method of claim 1, wherein the first, photochromic material-containing ophthalmic lens-forming composition is a liquid monomer injected into the front portion of the mold, against a rear gelled layer of the second ophthalmic lens-forming composition.

8. The method of claim 7, wherein the first ophthalmic lens-forming composition is injected into the mold through an injection port in an attached gasket.

9. The method of claim 1, wherein the second ophthalmic lens-forming composition is a liquid monomer injected into the rear portion of the mold against a front gelled layer of the first, photochromic material-containing ophthalmic lens-forming composition.

10. The method of claim 9, wherein the second ophthalmic lens-forming composition is injected into the mold through an injection port in an attached gasket.

11. The method of claim 9, wherein the mold includes a gas outlet port to permit the egress of gas in the mold during injection of the second ophthalmic lens-forming composition.

12. The method of claim 9, wherein the first, photochromic material-containing ophthalmic lens-forming composition is gelled against a front portion of the mold prior to adding the second ophthalmic lens-forming composition to a rear portion of the mold.

13. The method of claim 3, wherein the second ophthalmic lens-forming composition is gelled against a rear portion of the mold prior to adding the first, photochromic material-containing ophthalmic lens-forming composition to a front portion of the mold.

14. The method of claim 3, wherein the thickness of the first, photochromic material-containing composition is about 0.4 mm to about 2 mm after curing.

15. The method of claim 14, wherein the thickness of the second ophthalmic lens-forming composition is about 0.2 mm to about 20 mm.

16. The method of claim 15, wherein the thickness of the second ophthalmic lens-forming composition is about 5 mm to about 20 mm.

17. The method of claim 1, wherein neither the first, photochromic material-containing lens-forming composition nor the second lens-forming composition is a cured preform when the two compositions are contacted with radiation to polymerize and cure the two contacting compositions simultaneously.

18. The method of claim 1, wherein the first and second ophthalmic lens-forming compositions include a different polymerizable monomer, oligomer or polymer selected from the group consisting of an acrylate, a methacrylate, styrene, an allyl compound, a polycarbonate, a multi-functional acrylate or methacrylate, an acrylic- or methacrylic-terminated epoxy, an acrylic- or methacrylic-terminated urethane, an acrylic- or methacrylic-terminated ester, an unsaturated carboxylic acid, an unsaturated polyester resin, an acrylic acid ester, a methacrylic acid ester, a fumaric acid ester, an aromatic vinyl compound, and mixtures thereof.

19. The method of claim 1, wherein the first, photochromic material-containing ophthalmic lens-forming composition includes a mixture of a diacrylate or dimethacrylate compound with an epoxy group-containing material selected from the group consisting of an epoxy group-containing acrylate, an epoxy group-containing methacrylate, and mixtures thereof.

20. The method of claim 1, wherein the two ophthalmic lens-forming compositions, after curing, result in front and rear layers having a different index of refraction within about 0.05 units of each other.

21. The method of claim 18, wherein one of the ophthalmic lens-forming compositions is selected from the group consisting of bisphenol A bisallyl carbonate, diethylene glycol bisallyl carbonate, diallyl phthalate, diallyl diphenate, an unsaturated polyester, an aromatic vinyl compound, and mixtures thereof, and includes an acrylic material selected from an acrylate, a methacrylate, a multi-functional acrylate, a multi-functional methacrylate, and mixtures thereof.

22. The method of claim 21, wherein the acrylic material is a mono- or multi-functional acrylate or methacrylate selected from the group consisting of a mono acrylate, a diacrylate, a triacrylate, a tetraacrylate, a pentaacrylate, a monomethacrylate, a dimethacrylate, and a trimethacrylate.

23. The method of claim 22, wherein the multi-functional acrylate is selected from the group consisting of diethylene glycol diacrylate, ethoxylated trimethoylol propane triacrylate, pentaerythritol tetraacrylate, dipentaerythritol pentacrylate, tridecyl methacrylate, 1,12-dodecanediol dimethacrylate, trimethylolpropane trimethacrylate, tetraethyleneglycol dimethacrylate, polyethyleneglycol dimethacrylate, and mixtures thereof.

24. The method of claim 1, wherein the photochromic material in the first ophthalmic lens-forming composition is selected from the group consisting of a spiropyran, naphthopyran, benzopyran or chromene compound, a fulgide compound, a fulgimide compound, a spirooxazine compound, an organo-metal dithizonate, and mixtures thereof.

25. The method of claim 6, wherein the photochromic material absorbs light in a frequency of about 400 nm to about 600 nm when in the activated state.

26. The method of claim 6, wherein the second, non-photochromic material-containing ophthalmic lens-forming composition includes a UV-absorbing material that shields the first lens-forming composition from UV radiation wavelengths shorter than about 390 nm while allowing the passage of radiation having wavelengths sufficient to cure the first lens-forming composition.

27. The method of claim 26, wherein the UV-absorbing material allows the passage of radiation having a wavelength of about 400 nm to about 450 nm.

28. The method of claim 27, wherein the UV-absorbing material allows the passage of radiation having wavelengths over the full range of about 400 nm to about 450 nm.

29. The method of claim 1, wherein both the first and second ophthalmic lens-forming compositions include a polymerization initiator.

30. The method of claim 29, wherein the polymerization initiator is a photoinitiator.

31. The method of claim 29, wherein the polymerization initiator is a thermal initiator.

32. The method of claim 1, wherein the index of refraction of the cured second ophthalmic lens-forming composition is at least about 1.53.

33. The method of claim 1, wherein the index of refraction of the cured second ophthalmic lens-forming composition is at least about 1.56.

34. The method of claim 1, wherein the index of refraction of the cured second ophthalmic lens-forming composition is at least about 1.58.

* * * * *

UNITED STATES PATENT AND TRADEMARK OFFICE
CERTIFICATE OF CORRECTION

PATENT NO. : 6,863,848 B2　　　　　　　　　　　　　　　　　　　　　　　Page 1 of 1
DATED : March 8, 2005
INVENTOR(S) : Engardio et al.

It is certified that error appears in the above-identified patent and that said Letters Patent is hereby corrected as shown below:

Column 23,
Line 56, "perform" should be changed to -- preform --.
Line 57, after "of" the word "a" should be changed to -- the --.

Signed and Sealed this

Nineteenth Day of July, 2005

JON W. DUDAS
*Director of the United States Patent and Trademark Office*